US010685002B2

(12) United States Patent
Bordawekar et al.

(10) Patent No.: US 10,685,002 B2
(45) Date of Patent: *Jun. 16, 2020

(54) RADIX SORT ACCELERATION USING CUSTOM ASIC

(71) Applicant: International Business Machines Corporation, Armonk, NY (US)

(72) Inventors: Rajesh Bordawekar, Yorktown Heights, NY (US); Daniel Brand, Millwood, NY (US); Minsik Cho, Austin, TX (US); Brian R. Konigsburg, Austin, TX (US); Ruchir Puri, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/857,770

(22) Filed: Dec. 29, 2017

(65) Prior Publication Data

US 2018/0144010 A1    May 24, 2018

Related U.S. Application Data

(63) Continuation of application No. 14/750,072, filed on Jun. 25, 2015, now Pat. No. 9,953,044, which is a
(Continued)

(51) Int. Cl.
*G06F 16/22* (2019.01)
*G06F 12/02* (2006.01)
(Continued)

(52) U.S. Cl.
CPC ............ *G06F 16/2237* (2019.01); *G06F 7/24* (2013.01); *G06F 7/36* (2013.01); *G06F 9/30032* (2013.01);
(Continued)

(58) Field of Classification Search
None
See application file for complete search history.

(56) References Cited

U.S. PATENT DOCUMENTS

| 5,396,622 A | 3/1995 | Lee et al. |
| 6,088,511 A | 7/2000 | Hardwick |

(Continued)

OTHER PUBLICATIONS

Koichi Shirahata et al, "Out-of-Core GPU Memory Management for MapReduce-based Large-scale Graph Processing", IEEE 2014, 9 pages.*

(Continued)

*Primary Examiner* — Uyen T Le
(74) *Attorney, Agent, or Firm* — Fleit Intellectual Property Law; Jose Gutman

(57) ABSTRACT

An information processing system, computer readable storage medium, and method for accelerated radix sort processing of data elements in an array in memory. The information processing system stores an array of data elements in a buffer memory in an application specific integrated circuit radix sort accelerator. The array has a head end and a tail end. The system radix sort processing, with a head processor, data elements starting at the head end of the array and progressively advancing radix sort processing data elements toward the tail end of the array. The system radix sort processing, with a tail processor, data elements starting at the tail end of the array and progressively advancing radix sort processing data elements toward the head end of the array, the tail processor radix sort processing data elements in the array contemporaneously with the head processor radix sort processing data elements in the array.

20 Claims, 9 Drawing Sheets

Related U.S. Application Data continuation of application No. 14/582,314, filed on Dec. 24, 2014, now Pat. No. 9,928,261.

(60) Provisional application No. 61/932,929, filed on Jan. 29, 2014.

(51) Int. Cl.
    *G06F 9/30*         (2018.01)
    *G06F 7/36*         (2006.01)
    *G06F 16/23*       (2019.01)
    *G06F 16/28*       (2019.01)
    *G06F 7/24*         (2006.01)
    *G06F 9/38*         (2018.01)
    *G06F 12/0862*    (2016.01)

(52) U.S. Cl.
    CPC ........ *G06F 9/30047* (2013.01); *G06F 9/3881* (2013.01); *G06F 12/0238* (2013.01); *G06F 16/23* (2019.01); *G06F 16/283* (2019.01); *G06F 12/0862* (2013.01); *G06F 2212/1024* (2013.01); *G06F 2212/7203* (2013.01)

(56) References Cited

U.S. PATENT DOCUMENTS

| | | |
|---|---|---|
| 7,788,268 B2 | 8/2010 | Carroll |
| 2009/0129316 A1 | 5/2009 | Ramanathan et al. |
| 2011/0258205 A1 | 10/2011 | Shinjo et al. |
| 2012/0166734 A1 | 6/2012 | Zeidner et al. |
| 2014/0188906 A1 | 7/2014 | Muller et al. |

OTHER PUBLICATIONS

Agarwal, R., "A Super Scalar Sort Algorithm for RISC Processors" In Proceedings of ACM SIGMOD Int. Conf. on Management of Data, Jun. 1996, pp. 240-246.
Albutiu, M., et al., "Massively Parallel Sort-Merge Joins in Main Memory Multi-Core Database Systems," Proc. VLDB Endow, Aug. 2012, pp. 1064-1075.
Dachsel, H., et al., "Library Support for Parallel Sorting in Scientific Computations." Euro-Par Parallel Processing, Aug. 2007, 695-704.
Dusseau, A., et al., "Fast Parallel Sorting Under LogP: Experience with the CM-5." IEEE Transactions on Parallel and Distributed Systems, Jun. 1996, 1-27.
Gedik, B., et al., "CellSort: High Performance Sorting on the Cell Processor." In Proceedings of VLDB Endow, Sep. 2007, pp. 1286-1297.
Govindaraju, N., et al., "GPUTeraSort: High Performance Graphics Co-processor Sorting for Large Database Management." In Proc. ACM SIGMOD Int. Conf. on Management of Data, Jun. 27-29, 2006, pp. 1-12.
Guo, Q., et al., "AC-DIMM: Associative Computing with STT-MRAM." In Proc. Int. Symp. on Computer Architecture, Jan. 2013, pp. 1-12.
Zhang, K., et al., "A Novel Parallel Approach of Radix Sort with Bucket Partition Preprocess." In Proc. IEEE Conf. on Embedded Software and Systems, Jun. 2012, pp. 989-994.
Wikipedia, "Radix Sort," Edited online on Dec. 2014, Last visited on Mar. 31, 2015, pp. 1-19.
Inoue, H., et al., "AA-Sort: A New Parallel Sorting Algorithm for Multi-Core SIMD Processors." In Proc. Int. Conf. on Parallel Architectures and Compilation Techniques, Sep. 2007, pp. 1-10.
Jimenez-Gonzalez., D., et al., "Fast Parallel In-Memory 64-bit Sorting." In Proc. Int. Conf. on Supercomputing, Jun. 2001, pp. 114-122.
Kim, C., et al., "Sort vs. Hash Revisited: Fast Join Implementation on Modern Multi-Core CPUs." Proc. VLDB Endow, Aug. 2009, 1-12.
Kim, C., et al., "CloudRAMSort: Fast and Efficient Large-Scale Distributed RAM Sort on Shared-Nothing Cluster." In Proc. ACM SIGMOD Int. Conf. on Management of Data, May 20-24, 2012, pp. 1-10.
Lee, S., et al., "Partitioned Parallel Radix Sort." J. Parallel Distrib. Comput., Apr. 2002, pp. 1-12.
McIlroy, P., et al., "Engineering Radix Sort." Computing Systems, Oct. 1992, pp. 1-22, vol. 6, No. 1.
Merrill, D., et al., "High Performance and Scalable Radix Sorting: A Case Study of Implementing Dynamic Parallelism for GPU Computing." Parallel Processing Letters, Mar. 2011, pp. 1-28.
Ousterhout., J., et al., "The Case for RAMClouds: Scalable High-Performance Storage Entirely in DRAM." SIGOPS Oper. Syst. Rev, Dec. 2009, pp. 92-105, vol. 43, No. 4.
Pasetto, D., et al., "A Comparative Study of Parallel Sort Algorithms." In Proc. ACM Int. Conf. on Object Oriented Programming Systems Languages and Applications, Oct. 2011, pp. 1-18.
Ranganathan, P., "From Microprocessors to Nanostores: Rethinking Data-Centric Systems." IEEE Computer Society, Jan. 2011, pp. 39-48.
Satish, N., et al., "Fast Sort on CPUs and GPUs: A Case for Bandwidth Oblivious SIMD Sort." In Proc. ACM SIGMOD Int. Conf. on Management of Data, Jun. 2010, pp. 351-362.
Satish, N., et al., "Fast Sort on CPUs, GPUs and Intel MIC Architectures." Technical report, Intel Labs, Jun. 2010, pp. 1-11.
Singler, J., et al., "The GNU Libstdc++ Parallel Mode: Software Engineering Considerations." In Proc. of Int. Workshop on Multicore Software Engineering, May 11, 2008, pp. 1-8.
Singler, J., et al., "MCSTL: The Multi-Core Standard Template Library." In Proc. Int. Euro-Par Conf. on Parallel Processing, Aug. 2007, pp. 1-12.
Sohn, A., et al., "Load Balanced Parallel Radix Sort." In Proc. Int. Conf. on Supercomputing, Jul. 14-17, 1998, pp. 1-8.
Wassenberg, J, et al., "Engineering a Multi-core Radix Sort." In Proc. Int. Conf. on Parallel Processing. Aug.-Sep. 2011, pp. 160-169.
Zagha, M., et al., "Radix Sort for Vector Multiprocessors." In Proc. Int. Conf. on Supercomputing, Nov. 1991, pp. 1-10.
Edahiro, M., "Parallelizing Fundamental Algorithms such as Sorting on Multi-core Processors for EDA Acceleration." Jan. 2009, pp. 1-46.
Wassenberg, J., et al., "Faster Radix via Virtual Memory and Write-Combining." Sep. 7, 2010, pp. 1-6.
Ebert, A., "NTOSort," Apr. 2013, pp. 1-6.
Singler, J., et al., "The GNU libstdc++ parallel mode: Algorithms." No date provided, pp. 1-40.
Haglin, D., et al., "Scalable, Multithreaded, Partially-in-place Sorting." May 2013, pp. 1-9.
Bertasi, P., et al., "psort 2011—pennysort, datamation, joulesort." Jan. 2011, pp. 1-10.
Rashid, L., et al., "Analyzing and Enhancing the Parallel Sort Operation on Multithreaded Architectures," The Journal of Supercomputing, Aug. 2010, pp. 1-12, vol. 53, Issue 2.

* cited by examiner

For a working bucket "i" (process each buffer from i=0..255)

1. a logic block reads head[i], then compares tail[i]. If head[i]==tail[i], stop head/tail processor.

2. if not stopped
    2.1. head processor reads the element at the top of the buffer[i]
    2.2. compute the radix key (let say obtained k)
    2.3. write to the correct buffer[k]
    2.4. if buffer[i] has less than X element, prefetch to fill up buffer[i] from the main memory
    2.5. if buffer[k] has more than Y element, flush to the main memory The same steps are performed for the tail processor.

FIG. 9

RADIX SORT ACCELERATION USING CUSTOM ASIC

BACKGROUND

The present disclosure generally relates to information processing systems, and more particularly relates to a system and method capable of accelerated sorting of data elements in an array data structure.

Sorting is one of the most fundamental kernels in information management systems, such as in databases, in Hadoop (i.e., a Java-based programming framework that supports the processing of large data sets in a distributed computing environment), and so on, where data volume has been doubling nearly every 40 months since the 1980's. For example, sorting is an essential kernel in database indexing, redundancy removal, data clustering, in-equi join, and so on, which suffer heavily by the exploding data volume. Accelerating such sorting, therefore, can expedite many big data analytics and offer high value to customers.

There are many sorting algorithms which can be mapped into a hardware (HW) accelerator. Among them, a radix sort can be ideal for HW mapping, due to its distribution nature. Differently from quicksort and mergesort, the radix sort does not require expensive comparators, which allows a linear complexity on radix sorting. Simply using the key value itself as an index, radix sort can recursively distribute and further sort the input data elements. However, mapping a radix sort algorithm into an extremely high-performance HW implementation has been very challenging.

In-place radix sort is a popular distribution-based sorting algorithm for short numeric or string keys. It has a linear run-time and constant memory complexity. However, efficient use of in-place radix sort is very challenging for at least the following two reasons. First, the initial phase of permuting elements into buckets suffers read-write dependency inherent in its in-place nature. Secondly, load-balancing of the recursive application of the algorithm to the resulting buckets is difficult when the buckets are of very different sizes, which happens for skewed distributions of the input data.

The radix sort can be one of the best suited sorting kernels for many in-memory data analytics due to its simplicity and efficiency. Especially in-place radix sorting, which performs sorting without extra memory overhead, is highly desirable for in-memory operations for two reasons: a) The large memory footprint of in-memory databases calls for memory efficient supporting algorithms; and b) In-place radix sort can deliver higher performance with significantly fewer cache misses and page faults than approaches requiring extra memory. However, mapping a radix sort algorithm in an extremely high-performance HW implementation has been very challenging to reduce to practice.

BRIEF SUMMARY

According to one embodiment of the present disclosure, a method with an information processing system for accelerated radix sort processing of an array of data elements, the method comprising: transferring, with a pre-fetching engine in an application specific integrated circuit radix sort accelerator (Accelerator), data elements from an array of data elements in main memory to an array of data elements in a first memory in the Accelerator to be radix sort processed in the Accelerator, the Accelerator and a host processor that is separate from the Accelerator contemporaneously share access to the data elements in the array of data elements in the main memory in a data streaming architecture in which the Accelerator radix sort processes the data elements in the array in main memory, the first memory capacity to store data elements from the array in the main memory being a small portion of the array of data elements in the main memory, the pre-fetching engine predicting which data elements will be needed in a near future radix sort process in the Accelerator; radix sort processing, by at least one radix sort processor in the Accelerator, the data elements in the array of data elements in the first memory; and transferring, with the pre-fetching engine, the data elements that were radix sort processed in the array of data elements in the first memory in the Accelerator to the array of data elements in main memory.

According to another embodiment of the present disclosure, an information processing system capable of accelerated radix sort processing of an array of data elements, comprising: at least one host processor; main memory, communicatively coupled with the at least one host processor, and suitable for storing an array of data elements in the main memory; an application specific integrated circuit radix sort accelerator (Accelerator), separate from the at least one host processor, and communicatively coupled with the at least one host processor and the main memory, the Accelerator comprising: a first memory for storing an array of data elements to be radix sort processed in the Accelerator; at least one processor for radix sort processing data elements stored in the first memory; a pre-fetching engine, communicatively coupled with the at least one processor in the Accelerator and with the at least one host processor, the pre-fetching engine and the at least one processor, responsive to computer instructions, performing the following method: transferring, with the pre-fetching engine, data elements from the array of data elements in main memory to the array of data elements in the first memory in the Accelerator to be radix sort processed in the Accelerator, the Accelerator and the at least one host processor contemporaneously sharing access to the data elements in the array of data elements in the main memory in a data streaming architecture in which the Accelerator radix sort processes the data elements in the array in main memory, the first memory capacity to store data elements from the array in the main memory being a small portion of the array of data elements in the main memory, the pre-fetching engine predicting which data elements will be needed in a near future radix sort process in the Accelerator; radix sort processing, by the at least one processor in the Accelerator, the data elements in the array of data elements in the first memory; and transferring, with the pre-fetching engine, the data elements that were radix sort processed in the array of data elements in the first memory in the Accelerator to the array of data elements in main memory.

According yet to another embodiment of the present disclosure, a computer readable storage medium comprises computer instructions which, responsive to being executed by a processor of a plurality of processors of an information processing system, cause the processor to perform operations comprising: transferring, with a pre-fetching engine in an application specific integrated circuit radix sort accelerator (Accelerator), data elements from an array of data elements in main memory to an array of data elements in a first memory in the Accelerator to be radix sort processed in the Accelerator, the Accelerator and a host processor that is separate from the Accelerator contemporaneously share access to the data elements in the array of data elements in the main memory in a data streaming architecture in which the Accelerator radix sort processes the data elements in the array in main memory, the first memory capacity to store data elements from the array in the main memory being a small portion of the array of data elements in the main memory, the pre-fetching engine predicting which data elements will be needed in a near future radix sort process in the Accelerator; radix sort processing, by at least one radix sort processor in the Accelerator, the data elements in the array of data elements in the first memory; and transferring, with the pre-fetching engine, the data elements that were radix sort processed in the array of data elements in the first memory in the Accelerator to the array of data elements in main memory.

BRIEF DESCRIPTION OF THE SEVERAL VIEWS OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 9 is a text description of an example operational sequence followed by a processor in an ASIC radix sort accelerator to sort data elements, in accordance with various embodiments of the present disclosure.

DETAILED DESCRIPTION

Unlike comparison-based sorting algorithms (e.g., quicksort, mergesort, and heapsort), radix sort is a distribution-based algorithm which relies on a positional representation of each key (e.g., keys can be digits or characters, and can also be referred to as data elements). By reading a key as a sequence of numerical symbols from the most significant to the least significant (MSD), or in the other way from the least significant to the most significant (LSD), a radix sort groups keys into buckets by the individual symbol sharing the same significant position in every key.

Figure 1:
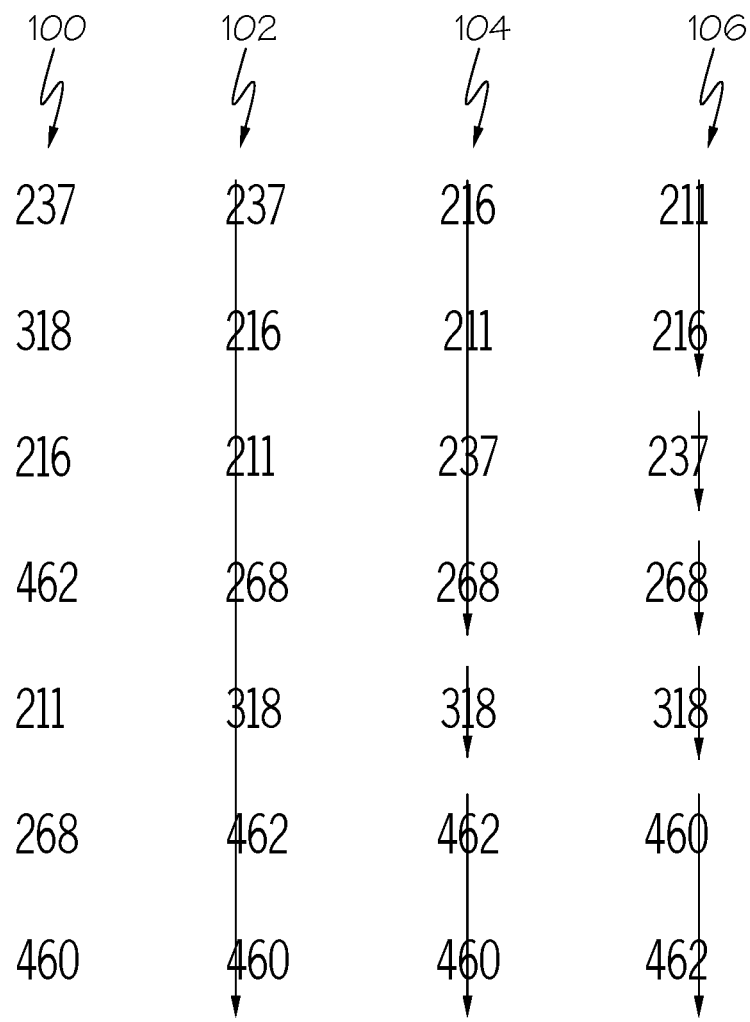
FIG. 1 is an example of a radix sort being applied to a set of numbers.

For example, FIG. 1 shows seven numbers 100 to be sorted using a radix sort process that sorts the numbers 100 starting with the most significant digit and then from the most significant to the least significant digit (MSD). A first pass of the radix sort uses the most significant digit 102 of each of the seven numbers to sort the numbers into three groups, i.e., the first group numbers have the number two as the most significant digit, the second group number has the number three as the most significant digit, and the third group numbers have the number four as the most significant digit.

Within each of these three groups of numbers, a second pass of the radix sort then uses the second most significant digit 104 of each of the numbers in the group to sort the numbers within each of the three sub-groups, e.g., the first sub-group (with the number two as the most significant digit) includes the numbers 216, 211, 237, and 268, which are sorted and further grouped into three sub-groups based on the second most significant digits 104, i.e., the first sub-group numbers have the number one as the second most significant digit, the second sub-group number has the number three as the second most significant digit, and the third sub-group number has the number six as the second most significant digit.

Lastly, a third pass of the radix sort then uses the least significant digits 106 of the numbers to sort the numbers in each of the sub-groups. For example, the first sub-group of numbers (i.e., 216 and 211), are further sorted based on the least significant digits 106 resulting in the sorted order (i.e., 211 and 216). As another example, the fourth sub-group of numbers (i.e., 462 and 460) are further sorted based on the least significant digits 106 resulting in the sorted order (i.e., 460 and 462). As shown in FIG. 1, there are five sub-groups resulting from the third pass of the radix sort.

In summary, the radix sort is a non-comparative sorting that recursively groups keys (e.g., numbers, and more generally data elements) by the individual digits sharing the same significant position and value. First, the radix sort algorithm sorts by the first digit and creates sub-groups based on the first digit, and then sorts the numbers in each of the sub-groups by the next digit, and so on.

Figure 2:
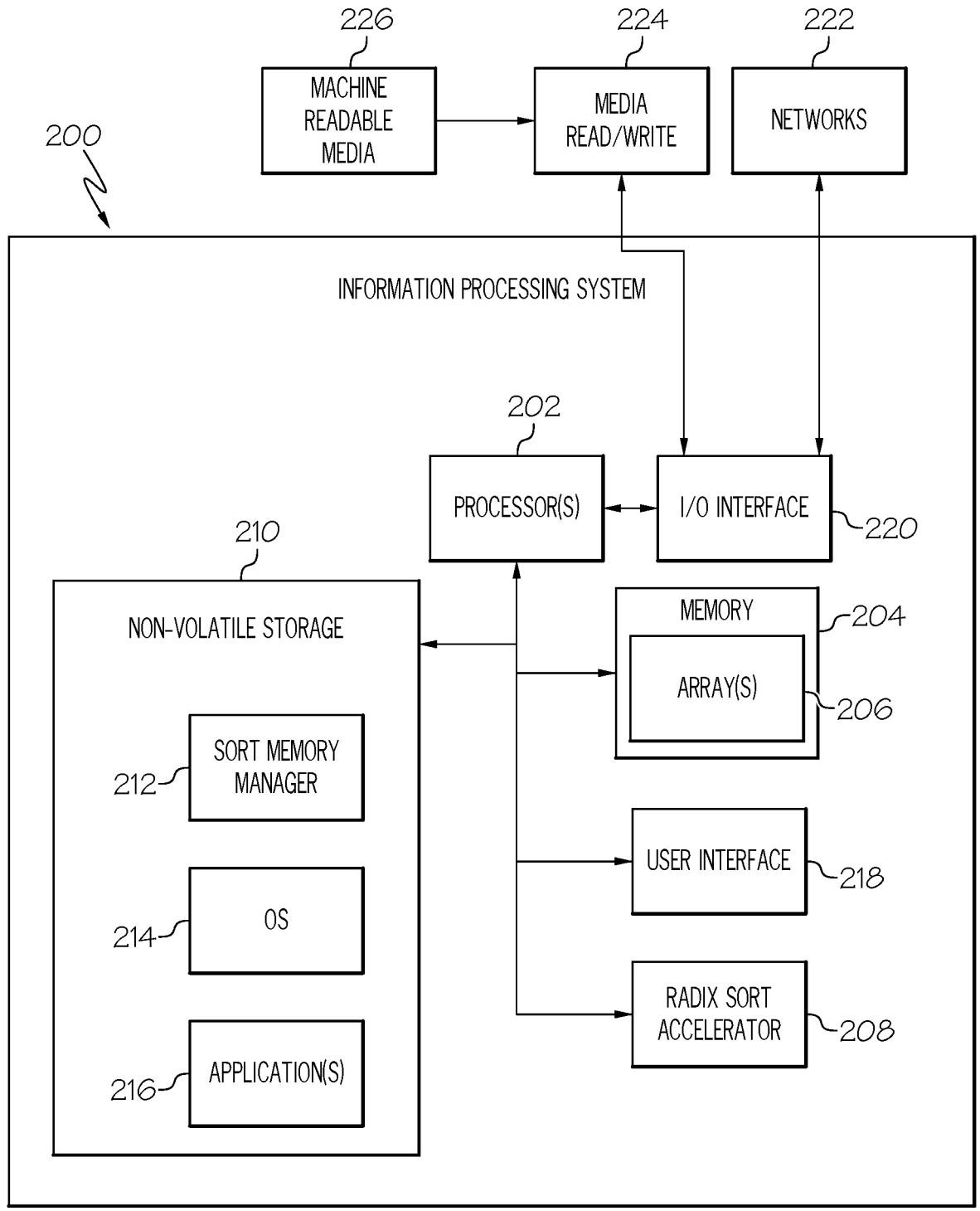
FIG. 2 is a block diagram illustrating an example of an information processing system according to various embodiments of the present disclosure.

According to various embodiments of the present disclosure, as shown in FIG. 2, disclosed is an information processing system 200 capable of performing an accelerated radix sort algorithm that can efficiently sort very large amounts of data. The information processing system 200 shown in FIG. 2, according to one example, includes at least one host processor 202. The at least one processor 202 is communicatively coupled with main memory 204 which stores one or more arrays 206 of data elements. The processor 202 may operate to sort any of the arrays 206 in accordance with computer instructions used by the processor 202. The at least one processor 202 is also communicatively coupled with non-volatile memory 210. The non-volatile memory 210 can store data, configuration parameters, and computer instructions, that are useable by the processor 202.

A sort memory manager 212 is stored in the non-volatile storage 210. The sort memory manager 212 can interoperate with the processor 202 to provide novel functions and features of the information processing system 200 such as to operate according to a novel radix sort process, as will be discussed in more detail below.

According to the present example, an operating system 214 is stored in the non-volatile storage 210. Also, one or more applications 216 can be stored in the nonvolatile storage 210. Any of the applications 216 and/or the operating system 214 may manage sorting a collection of data elements in the one or more arrays 206 in the main memory 204. That is, a natural kernel of functions in any of the applications 216 and/or the operating system 214 can typically include sorting data elements in one or more arrays 206.

An input-output interface 220 is communicatively coupled with the processor 202 and provides a communication interface with external networks 222 as shown. The external networks 222, according to various embodiments, may include at least one wide area network, at least one local area network, at least one wireless communication network, and any combination thereof. The input-output interface 220 can also be communicatively coupled with a media reader-writer 224. The media reader-writer 224 can be communicatively coupled with a computer-readable storage medium 226 allowing the processor 202 to read data and computer instructions from, and optionally write data and computer instructions to, the computer-readable storage medium 226.

The processor 202 is communicatively coupled with a user-interface 218. The user interface 218 includes a user output interface and a user input interface.

The user input interface can include one or more of a keypad (or keyboard), a navigation mechanism such as a roller ball, an optical navigation module (i.e. trackpad), a joystick, a mouse, or a navigation disk, for manipulating operations of the information processing system 200. The keypad (or keyboard) can be an integral part of a housing assembly of the information processing system 200 (e.g., part of a housing for a mobile phone 110 or a laptop PC 108), or an independent device operably coupled to the information processing system 200 by a tethered wireline interface (such as a Universal Serial Bus (USB) cable) or a wireless interface supporting, for example, Bluetooth. The keypad (or keyboard) can include a numeric keypad and/or a QWERTY keypad with alphanumeric keys. The keypad (or keyboard) can also include a single button or switch that can invoke function(s) of the information processing system 200 upon activation of the single button or switch.

The user input interface can further include a microphone circuit that receives audio signals from an ambient environment in vicinity of the microphone circuit, and converts the audio signals to electronic audio signals. According to certain embodiments, the microphone circuit, and coupled with associated audio conditioning and processing circuitry, can be used for voice recognition applications such as to receive voiced commands and information from a user of the information processing system 200.

The user output interface can include a display such as a monochrome or color Liquid Crystal Display (LCD), Organic Light Emitting Diode (OLED) or other suitable display technology for conveying images to a user of the information processing system 200. In an embodiment where the display is touch-sensitive, a portion or all of the keypad can be presented by way of the display with navigation features.

The display can use touch screen technology to also serve as a user interface for detecting user input (e.g., touch of a user's finger). As a touch screen display, the information processing system 200 can be adapted to present a user interface with graphical user interface (GUI) elements that can be selected by a user with a touch of a finger. The touch screen display can be equipped with capacitive, resistive or other forms of sensing technology to detect how much surface area of a user's finger has been placed on a portion of the touch screen display. This sensing information can be used to control the manipulation of the GUI elements. The display can be an integral part of the housing assembly of the information processing system 200 or an independent device communicatively coupled thereto by a tethered wireline interface (such as a cable) or a wireless interface.

According to various embodiments, the user output interface can further include an audio system that utilizes audio technology for conveying low volume audio (such as audio heard in proximity of a human ear) and high volume audio (such as speakerphone for hands free operation).

In the example of FIG. 2, the at least one host processor 202 is communicatively coupled with a radix sort accelerator (Accelerator) 208, such as via a high-speed bus architecture. The at least one host processor 202 can interoperate with the radix sort accelerator 208, while both the processor 202 and the Accelerator 208 contemporaneously share access to the main memory 204 in a direct memory access (DMA) hardware arrangement. This hardware architecture can be utilized by the sort memory manager 212 to map a radix sort algorithm in an extremely high-performance hardware implementation, as will be discussed in more detail below.

Figure 3:
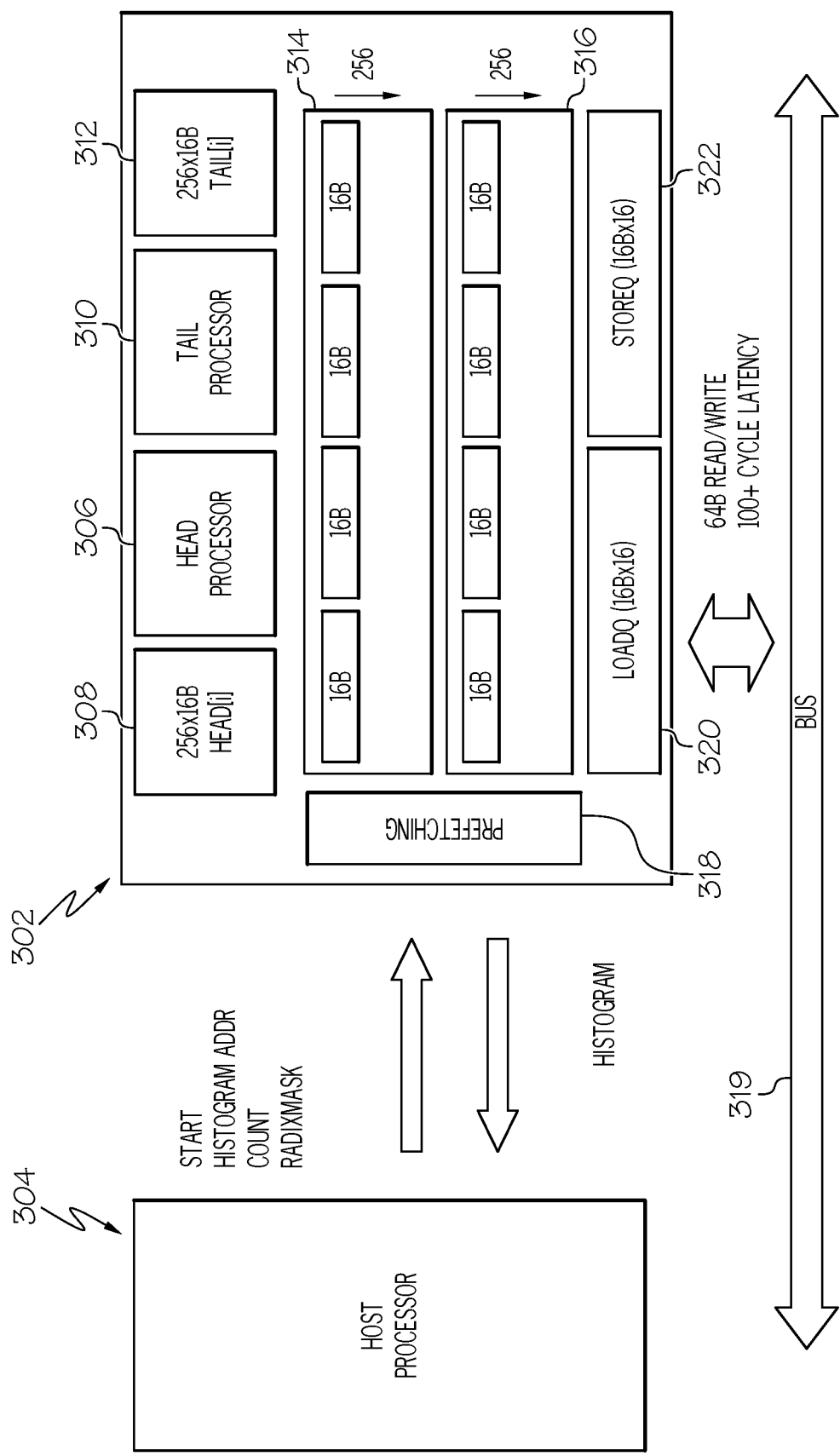
FIG. 3 is a block diagram illustrating an example of an application specific integrated circuit (ASIC) that can interoperate with at least one host processor to implement an accelerated radix sort process, according to various embodiments of the present disclosure.

As shown in FIG. 3, a Radix Sort Accelerator 302 comprises a dual-core (or dual-thread) processor system. According to various embodiments, at least two processors 306, 310, are used to enhance performance of the radix sort algorithm through parallelism. Unlike prior art systems that sort using a software-based radix sort algorithm typically implemented with a single processor, the inventors discovered a novel way to implement a dual-core radix sorting engine with very low complexity and low overhead processing. As a result of the use of a specialized dual-core sorting engine 306, 310, the inventors have implemented a hardware solution that has achieved 1.9 times throughput enhancement in the Accelerator 302.

Some prior art sorting engines require use of a temporary buffer as large as the entire array 206 stored in main memory 204, which can double the memory-footprint of a sorting hardware implementation. This additional memory adds cost and complexity to a sorting hardware implementation. A larger memory temporary buffer may still not be sufficient to meet the sorting requirements of very large data arrays 206 which are too large to be completely stored in on-board (on-chip) memory. The inventors have discovered a way to implement an "in-place" radix sorting accelerator design in an application specific integrated circuit (ASIC) 302. The new ASIC radix sort accelerator design does not use a memory temporary buffer as large as the entire array 206 stored in main memory 204, which would have doubled the memory foot-print as was the case in prior art sorting engines. The new ASIC 302 utilizes a novel data streaming architecture that allows sorting of very large arrays that are much larger than the available on-board (on-chip) memory in the ASIC 302. This new "in-place" radix sorting design is suitable for memory-limited platforms.

To further accelerate the processing of data elements in a radix sorting algorithm, according to various embodiments, the ASIC 302 utilizes a custom pre-fetching architecture. The Accelerator 302 is equipped with a custom pre-fetching engine 318 which is tailored for in-place radix sorting, as will be discussed in more detail below. With efficient pre-fetching hardware, the Accelerator 302 can hide long memory latency to access the main memory 204.

The Accelerator 302, according to various embodiments, utilizes a novel data streaming architecture that allows sorting of a collection of data elements much larger than the on-board (on-chip) memory capacity. Many existing sorting accelerators (ex., GPU), on the other hand, require the entire sorting problem (i.e., all the data elements) first be located in on-board (on-chip) memory, which can be costly hardware-wise and which limits the scalability of any hardware solution. The Accelerator 302 design provides for a streaming data sort accelerator with no need for such a large memory requirement as in previous sorting engines. By consuming the read data immediately, the novel Accelerator 302 solution, according to various embodiments, uses a small silicon area as well as low power consumption.

The sorting Accelerator 302, in the present example, behaves like a DMA (direct memory access) engine. The Accelerator 302 reads a data element, and then writes the data element to an address to make the input data element sorted.

As shown in the example of FIG. 3, the Accelerator 302 is communicatively coupled to a system bus 319. The Accelerator 302 initiates the sorting process based on receiving a request from the host processor 304. Once initiated, the Accelerator 302 fetches a data element from the bus 319 and writes it to the correct address to make the input data element sorted. As discussed above, the novel Accelerator 302 design does not keep any intermediate data (i.e., no temporary buffer), eliminating any large memory requirement.

Also, the novel Accelerator 302 utilizes a dual-core processor 306, 310 architecture design that achieves an increase of about two times the data processing throughput of a single core processor design. The novel dual-core processor implementation has very low HW-overhead, by exploiting radix sorting algorithmic features for efficient dual-threading.

As shown in the example of FIG. 3, the pre-fetching logic (pre-fetching engine) 318, at the radix sort algorithm level, can predict which data elements are needed in a near future radix sort process. Additionally, by utilizing algorithmic knowledge in the pre-fetching logic 318, the Accelerator 302 hides memory latency when accessing the memory 204. According to the present example, the pre-fetched elements are kept in a buffer 314, 316, of two hundred and fifty six by sixty four bytes size for each processor 306, 310.

It should be noted that the data structures and the numbers of bytes used in FIG. 3 are only to illustrate an example, and not for limitation of the alternative embodiments of the invention which can utilize any size data buffers and can provide data communication interfaces that are different than via the bus interface 319 shown in FIG. 3. As another example, and not for limitation, the sixteen byte blocks in the data structures shown in FIG. 3 could be changed to another number of bytes in each block and the two hundred and fifty six rows in the buffers 314, 316, and the two hundred and fifty six pointers 308, 312, could be changed to any number such as $2^{radix\_bit}$ (i.e., the number two raised to a power which is the number of the position of the radix_bit), where the radix_bit would be a bit position in all data elements in an array used for determining the radix sort algorithm of the data elements.

Referring to FIG. 3, an application specific integrated circuits (ASIC) accelerator 302 is shown, according to various embodiments of the present disclosure. The ASIC 302 intercommunicates with a host processor 304 to implement an accelerated RADIX sort process. A high-speed architecture allows communication between the ASIC 302 and the host processor 304, and it additionally allows direct memory access (DMA) by the ASIC 302 with the memory 204. In this way, the ASIC 302 can access the main memory 204 to access the one or more arrays 206 while the host processor 304 contemporaneously can access the memory 204. This results in a very efficient high-speed communication of data elements between the ASIC 302 and the one or more arrays 206 in the memory 204, with minimal synchronization overhead between the ASIC 302 and the host processor 304.

The host processor 304, in this example, sends to the ASIC 302 the following information, a start address, a histogram address, a data element count, and a Radix mask. The ASIC 302 sends to the host processor 304 a histogram ready signal that indicates to the host processor 304 that the ASIC 302 has generated a histogram starting at the histogram address provided by the host processor 304. This histogram can be used by the host processor 304 to determine the organization of memory buckets that would contain the sorted data elements. See, for example, the discussion above with regards to FIG. 1. As can be seen in FIG. 1, for example, a first pass of a radix sorting process would generate a histogram indicating three buckets (i.e., three groups of numbers) based on the MSD of each number to be sorted. That is, the first bucket of numbers would contain four data elements as there are four numbers with the number two as the most significant digit, the second bucket would contain one data element with the number three as the most significant digit, and the third bucket would contain two data elements as there are two numbers with the number four as the most significant digit.

The start address indicates the location in main memory 204 of a first data element in the array 206. The count value indicates to the ASIC 302 how many data elements from the start address are to be processed by the ASIC 302. Therefore, with the start address and the count value the ASIC 302 can point to all the data elements in the array 206 that are to be sorted. It should be noted that the number of data elements to be processed by the ASIC 302 can be less than the total number of data elements in the entire array 206. That is, the host processor 304 can select to break down (e.g., structurally decompose) a total sorting problem into smaller sub-problems of groups of data elements that are less than the total number of data elements in the entire array 206, as will be discussed in more detail below.

The Radix mask indicates to the ASIC 302 what position in each data element to base the Radix sort operations. For example, with reference to FIG. 1, the radix mask would indicate in the first pass the MSD 102 in each of the numbers sorted, and in the second pass the radix mask would indicate the second most significant digit 104 in each of the numbers sorted, and so on for subsequent passes. The ASIC 302 will now be disclosed in more detail below.

According to various embodiments, a dual core processor 306, 310 is used in the ASIC 302 to process the one or more data elements in the array 206. The dual core processor comprises a head processor 306 and a tail processor 310 which can independently process a radix sort algorithm on the collection of data elements from the array 206.

In the ASIC 302 there is stored a collection of head pointers 308 that can be used by the head processor 306 and a collection of tail pointers 312 that can be used by the tail processor 301. According to the present example, the collections of head pointers 308 and tail pointers 312 are stored in one or more register files. The head pointers 308 and the tail pointers 312 point into buffer memory 314, 316 in the ASIC 302. It should be noted that, according to various embodiments, the buffer memory 314, 316 could comprise one or more register files 314, 316.

The buffer memory can store a collection of data elements in a first portion of the buffer memory 314 and a second collection of data elements in a second portion 316 of the buffer memory. The first portion of buffer memory 314 is used by the head processor 306 to radix sort data elements from the array 206 while the second portion of buffer memory is used by the tail processor 310 to radix sort data elements from the array 206. The organization of data structures in the buffer memory 314, 316, in the head pointers 308 and the tail pointers 312, and the Radix sorting operations of the head processor 306 and the tail processor 310, will be discussed in more detail below.

A pre-fetching engine 318, and the buffer architecture 314, 316, are tailored for in-place radix sort operations by the head processor 306 processing data elements from a first direction in the array 206 (i.e., from head to tail of the array) and a separate tail processor 310 processing data elements from a second direction in the array 206 (i.e., from tail to head of the array).

A Load Queue 320 function in the ASIC 302 can be used by the pre-fetching engine 318 to load a collection of data elements from the array 206 in main memory 204 into the on-board (on-chip) buffer memory 314, 316, and a Store Queue function 322 can be used by the pre-fetching engine 318 to store a collection of data elements to the array 206 in main memory 204 from the buffer memory 314, 316. The Load Queue function 320 and the Store Queue function 322, according to the present example, operate using DMA to access via a high-speed bus 319 the main memory 204. The arrangement of the data structures in buffer memory 314, 316 and the operations of the head processor 306 and the tail processor 310 will be discussed in more detail below.

Figure 4:
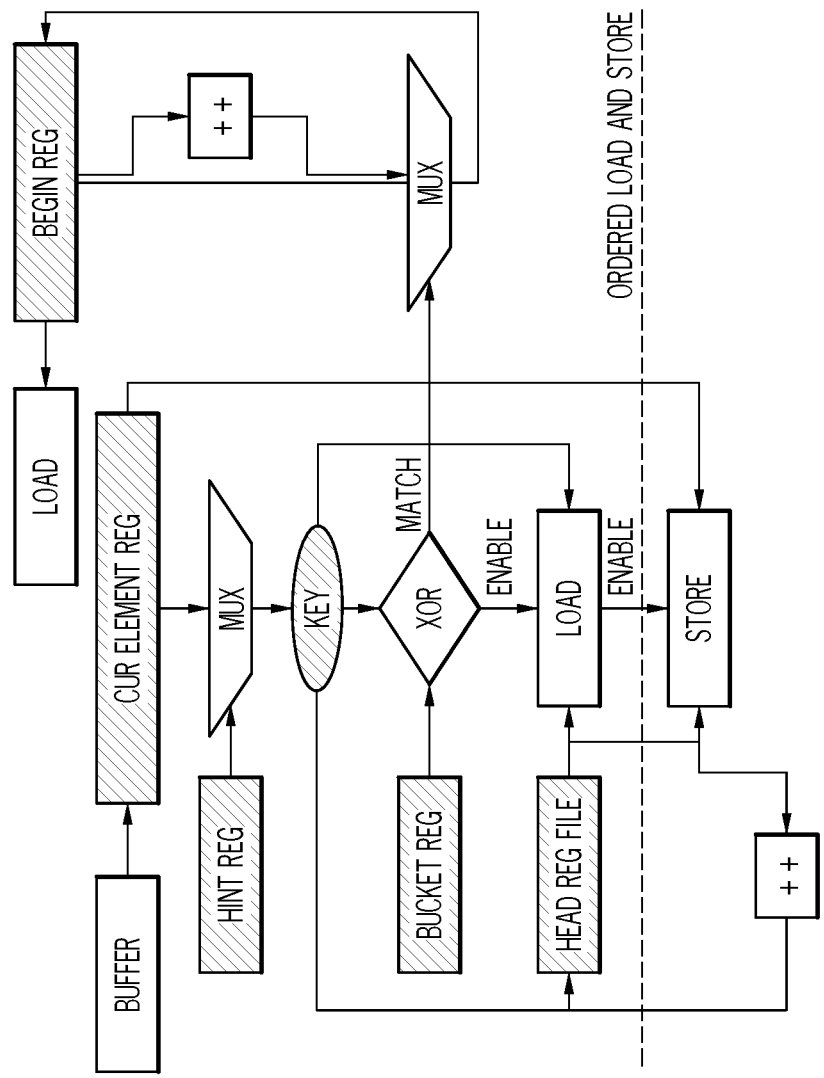
FIG. 4 is a block diagram illustrating an example of digital logic circuit elements that can be used in the ASIC of FIG. 3 to implement an accelerated radix sort process, according to various embodiments of the present disclosure.

As shown in FIG. 4, the ASIC Accelerator 302 utilizes combinations of logic circuits, such as exclusive or logic circuits and multiplexers to efficiently and quickly process data elements (also referred to as keys) during a Radix sort of the data elements.

As an initial phase in processing a radix sort of an array 206, or a portion thereof, as assigned to the Accelerator 302 by the host processor 304, the Accelerator 302 processes through all of the set of data elements being sorted and generates a histogram of all of the data elements based on the Radix mask indicating the relevant position in each data element to perform the Radix sort operations on the data elements. In the present example, a processor 306, 310, in the ASIC 302 reads a byte in each number (in each data element) which is the relevant position in each number to base the Radix sort of all the data elements. Since a byte can have 256 different values, the ASIC 302 generates a histogram identifying 256 groups (or buckets) of data elements being radix sorted by the ASIC 302. By the histogram the host processor 304 can determine how many zeros are in the relevant position in the data elements, how many twos are there, how many threes are there, and so on. Then, the host processor 304 can assigned to the Accelerator 302 a sorting problem (or sub-problem) to perform the radix sort on a set of the data elements, as will be discussed in more detail below.

Figure 5:
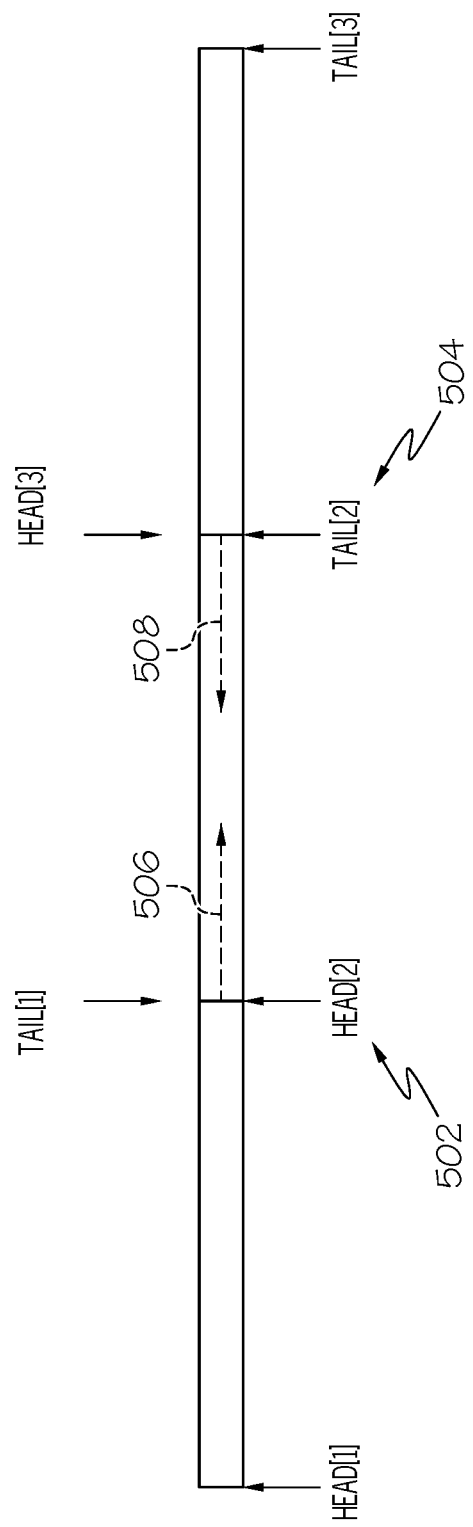
FIG. 5 is a block diagram illustrating an example of processing data elements in the ASIC of FIG. 3 for implementing an accelerated radix sort process, according to various embodiments of the present disclosure.

After a sorting problem (or sub-problem) on a set of data elements is assigned to the ASIC 302, the dual-core processors 306, 310, process all of the data elements in the set. FIG. 5 illustrates an example of how the head processor 306 processes data elements from one direction in one of the buckets while the tail processor 310 independently parallel processes data elements from a second direction in the same one of the buckets. In the example, a buffer memory 314, 316 is (or optionally one or more register files 314, 316 are) organized into two hundred and fifty six rows by sixty four bytes for each of the head processor 306 and the tail processor 310, totaling five hundred and twelve rows, to process data elements in parallel according to the novel radix sort process of the present disclosure.

With reference to FIG. 3, a first portion 314 of the buffer memory is used by the head processor 306 and a second portion 316 of the buffer memory is used by the tail processor 310. The head processor 306 uses 256 head pointers 308 to point into 256 rows in the first portion 314 of the buffer memory, while the tail processor 310 uses 256 tail pointers 312 to point into 256 rows in the second portion 316 of the buffer memory. Each of the rows in the first portion 314 of the buffer memory corresponds to one bucket of two hundred and fifty six buckets in which data elements from the array 206 can be stored in a FIFO Queue data structure across the columns of each row. Similarly, data elements from the array 206 are stored in the second portion 316 of the buffer memory in each one bucket of the two hundred and fifty six buckets, each organized as a FIFO queue. The head processor 306 and the tail processor 310 independently parallel process data elements in each of the two hundred and fifty six buckets. As shown in the example of FIG. 5, each bucket is pointed to by a head pointer and a tail pointer. FIG. 5 shows three buckets. In the second bucket, the head processor 306 points to data elements using the particular head pointer 308, 502, to progressively apply a radix sort algorithm to data elements pointed to by the head pointer 308, 502 from left to right (i.e., processing the data elements from the head to the tail of the bucket).

As shown in FIG. 5, the tail processor 310 uses the tail pointer 312, 504, to point into data elements in the second bucket. In the second bucket, the tail processor 310 points to data elements using the particular tail pointer 312, 504, to progressively apply a radix sort algorithm to data elements pointed to by the tail pointer 312, 504, from right to left (i.e., processing the data elements from the tail to the head of the bucket).

The head processor 306 processes data elements in the second bucket from the head 502 to the tail 504, while the tail processor 310 processes data elements in the second bucket from the tail 504 to the head 502. The head pointer 502 and the tail pointer 504 are progressively advanced as each of the head processor 306 and tail processor 310 process data elements in the second bucket. When the value in the head pointer 502 is equal to the value in the tail pointer 504, then the second bucket has been completely processed by the radix sort algorithm. The other buckets in the buffer memory 314, 316 are similarly processed by the head processor 306 and the tail processor 310.

That is, in the first portion 314 of buffer memory, the head processor 306 processes two hundred and fifty six rows of data elements in which each row corresponds to one bucket of two hundred and fifty six buckets. For example, the head processor 306 can sequentially check each of the buckets zero, one, two, three, and so on, to apply the radix sort to the elements in each of the buckets. In similar fashion, the tail processor 310 processes data elements in the second portion 316 of the buffer memory organized in two hundred and fifty six buckets. That is, the tail processor 310 processes two hundred and fifty six rows of data elements in which each row corresponds to one bucket of two hundred and fifty six buckets. For example, the tail processor 310 can sequentially check each of the buckets zero, one, two, three, and so on, to apply the radix sort to the elements in each of the buckets.

The head processor 306 and the tail processor 310 independently parallel process data elements in each of the two hundred and fifty six buckets.

Figure 6:
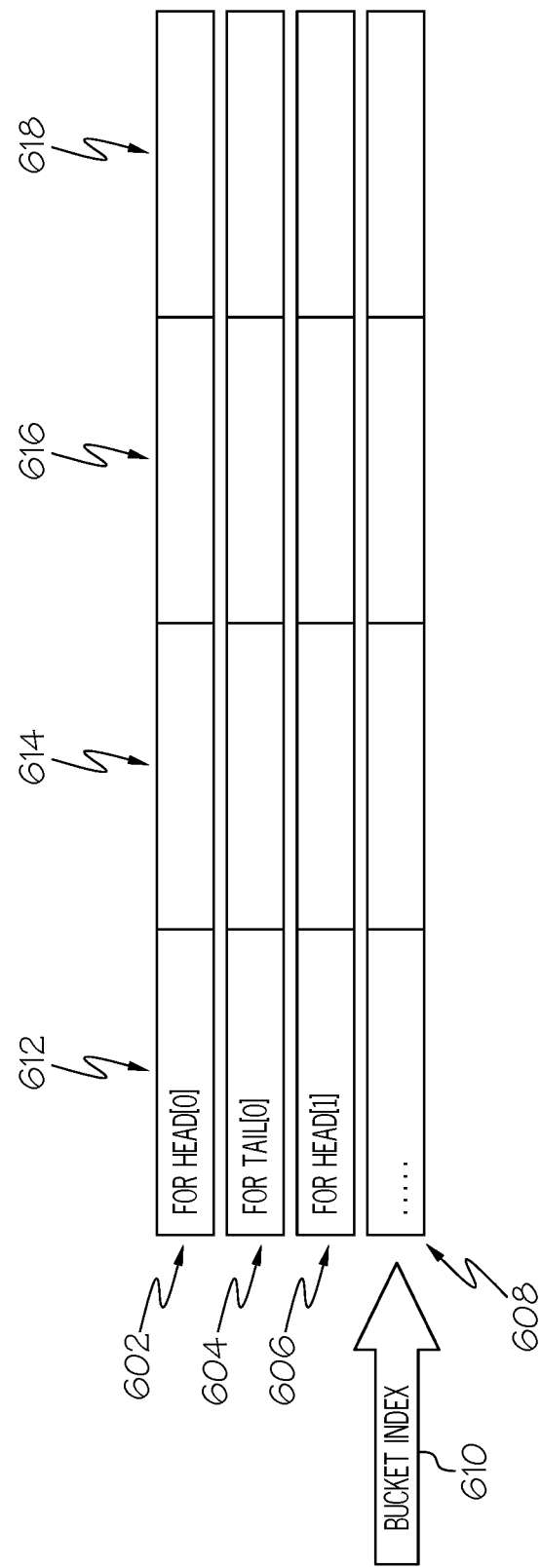
FIG. 6 is a block diagram illustrating an example of a memory data structure in the ASIC of FIG. 3 suitable for processing data elements by processors performing an accelerated radix sort process, according to various embodiments of the present disclosure.

Referring to FIG. 6, each bucket in a buffer memory 314, 316 (or optionally in one or more register files 314, 316) is indexed by a head pointer 308 and a tail pointer 312. As shown in FIG. 6, the first row 602 contains data elements in bucket number zero that are pointed to by the respective head pointer 308, while row number two 604 contains data elements in bucket number zero that are being pointed to by the respective tail pointer 312. The third row 606 contains data elements pointed to by the respective head pointer 308 in bucket number one and in similar fashion the next rows 608 contain data elements organized by the respective buckets stored in the buffer memory 314, 316. This organization of the buffer memory 314, 316, is suitable for processing data elements by the processors 306, 310, performing an accelerated radix sort process.

As the head processor 306 processes data elements in row number one 602, it progressively processes data elements from left to right in the row as indicated by the columns 612, 614, 616, 618. The head processor 306 progressively applies the radix sort algorithm to each data element for each of the two hundred and fifty six buckets 602, 606, 608, as stored in the first portion 314 of buffer memory. The tail processor 310, in similar fashion, progressively applies a radix sort algorithm to each data element stored in the two hundred and fifty six buckets 604, 608, in the second portion 316 of buffer memory. The present example shows four sixteen-byte columns 612, 614, 616, 618, of data elements (i.e., total 64 bytes) being stored for each row 602, 604, 606, 608. This is only one example and many different arrangements of data elements may be used in buffer memory 314, 416, according to various embodiments of the present disclosure.

According to the present example, the four columns 612, 614, 616, 618, (i.e., total sixty four bytes) for each row can be filled with data elements such that the head processor 306 and tail processor 310 can continue applying the radix sort algorithm to data elements in each of the buckets without significant delay due to latency of accessing the external memory 204 via the bus 319. The slower the latency of accessing the external main memory 204, the larger the total number of columns 612, 614, 616, 618, (i.e., total number of bytes) that would be stored in the local (e.g., on-chip) buffer memory 314, 316, for each row to help keep the head processor 306 and the tail processor 310 operating without significant delay. A design of an ASIC architecture can be customized to provide a sufficiently large number of columns 612, 614, 616, 618, (e.g., possibly greater than the total sixty four bytes shown in the present example) to allow the pre-fetching engine 318 to use the pre-fetch load queue function 320 to pre-fetch data elements from the memory 204 to pre-load the buffer memory locations 314, 316, with data elements before all data elements are processed in each row 602, 604, 606, 608, to avoid significant delay due to latency of accessing the external memory 204 via the bus 319. The pre-fetching engine 318 utilizes the load queue function 320 to continue pre-loading data elements (e.g., a group of data elements pre-loaded with one load queue function operation) into each row for each bucket 602, 604, 606, 608, to keep the respective processor 306, 310, operating on data elements before all data elements in a row have been depleted (i.e., all have been processed), without significant delay due to latency of data access to main memory 204.

In similar fashion, the pre-fetching engine 318 utilizes the store queue function 322 to flush a number of data elements from a particular row to the array 206 in the external memory 204. Based on a design specification for maximum latency of data access from the ASIC to main memory 204, a total number of columns 612, 614, 616, 618, (i.e., total number of bytes) in the local (e.g., on-chip) buffer memory 314, 316, for each row can be customized to help keep the head processor 306 and the tail processor 310 operating without significant delay. As a block of data elements is transferred to the main memory 204 it frees up buffer memory for pre-fetch loading of additional data elements from the main memory into the buffer memory 314, 316.

According to the present example, the head processor 306 operates on bucket number 0, which is the first row 602, and then goes to bucket number one which is row 606, and so forth until all 256 buckets are processed, and then the head processor 306 returns back to process bucket number 0 at row 602. In similar fashion, the tail processor 310 processes the 256 buckets from the tail end to the head end of each bucket. See FIG. 5 for an example. A bucket index 310 is used by the pre-fetching engine 318 to progressively check each bucket to determine the number of data elements available to be processed by the particular processor 306, 310. If the number of data elements reaches a lower threshold, the pre-fetching engine 318 then loads additional data elements from the main memory 206 to the particular row for the bucket in the buffer memory 314, 316.

On the other hand, when the number of data elements in a row 602, 604, 606, 608, reaches an upper threshold value then the pre-fetching engine 318 utilizes the store queue function 322 to flush a number of data elements from the particular row to the array 206 in the external memory 204. In this way, the pre-fetching engine 318 operates to keep enough data elements in the particular rows in the buffer memory 314, 316, so that the head processor 306 and the tail processor 310 can continue processing data elements without significant delay due to latency in data access of the external main memory 204 via the bus 319 architecture.

Figure 8:
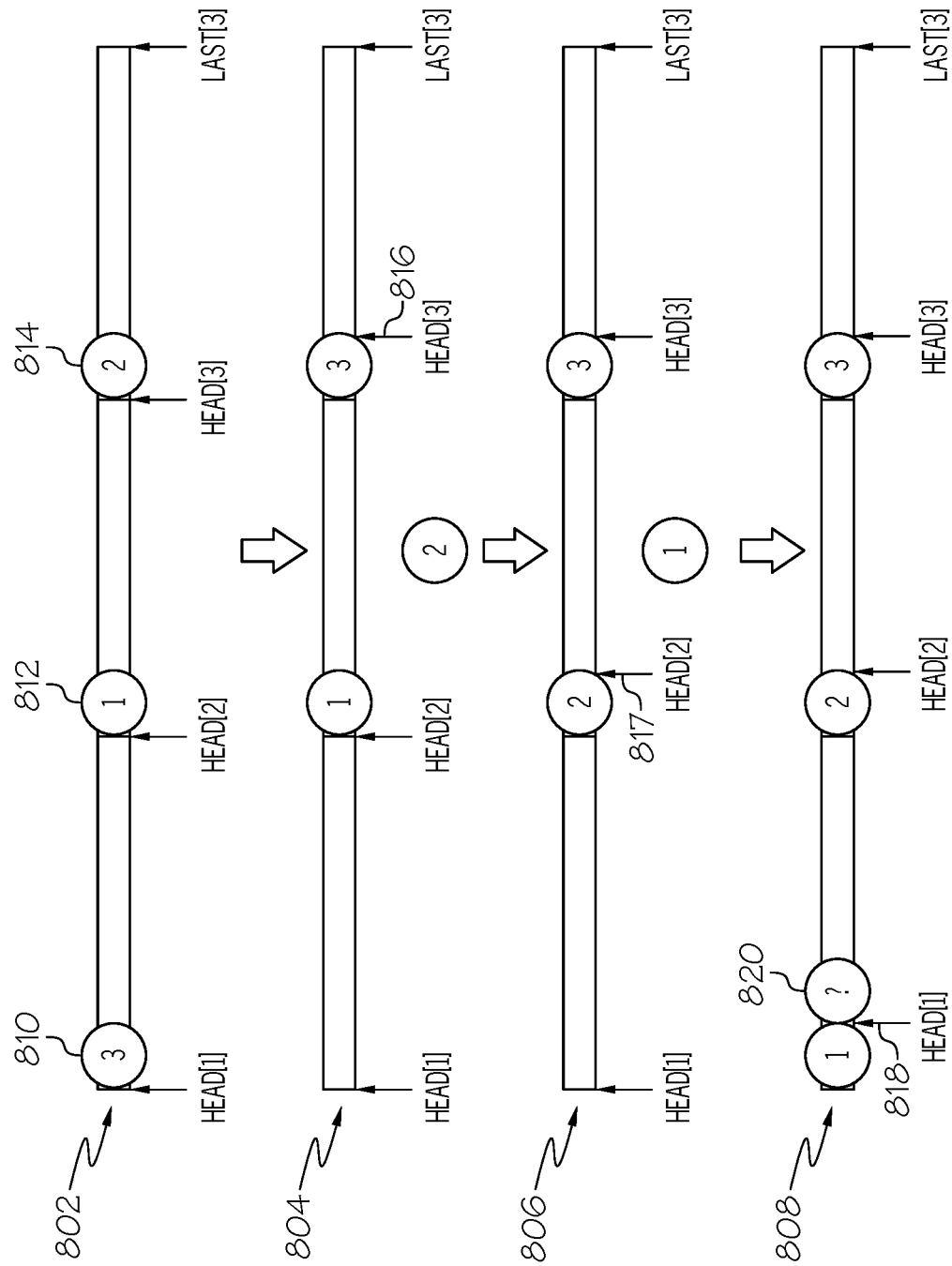
FIG. 8 is a block diagram illustrating an example of processing data elements for implementing an accelerated radix sort process, in accordance with various embodiments of the present disclosure.

FIG. 8 illustrates an example of a processing sequence performed by the head processor 306 in processing data elements in three buckets. The operation sequence starts at a first phase 802 and then proceeds to a second phase 804, a third phase 806, and a fourth phase 808. In the first phase 802, a first element 810 is stored in the first bucket and pointed to by the head pointer. The first data element 810 has the number 3 for the significant Radix sort symbol used for sorting data elements into the three buckets. The second bucket contains a data element 812 with the number 1 as the significant Radix sort symbol. The third bucket contains a data element 814 with the number 2 as the significant Radix sort symbol.

The head processor 306, according to the Radix sort algorithm, will process these data elements in the three buckets. As a result of the radix sort algorithm, all data elements with the number one will be sorted into the first bucket, all data elements with the number two will be sorted into the second bucket, and all data elements with the number three will be sorted into the third bucket.

In the second phase 804, the head processor 306 reads the first data element 810 in bucket number 1. From the number three in the data element 810, the head processor 306 determines that the data element 810 according to the radix sort algorithm is to be stored in the third bucket. The head processor 306 reads the value of the head pointer for bucket number 3, and determines that it is pointing to a data element 814 that has a number two as the significant Radix sort symbol. So the head processor 306, according to the radix sort algorithm, swaps the number three data element 810 with the number two data element 814, and holds the number two data element 814 in a temporary store (e.g., a register memory location), as shown in the second phase 804.

The head processor 306 advances the value in the head pointer 816 for the third bucket to point to the next data element position in the third bucket. That is, the first data element in the third bucket has been swapped such that it is now a number three data element 810 and needs no further processing according to the radix sort algorithm.

The data element with the number two 814, has been swapped out of the third bucket and is held in a temporary store, as shown in the second phase 804. The head processor 306 determines that the data element with the number two 814 is to be stored in the second bucket. However the head pointer of the second bucket is pointing to a data element with the number one 812. Therefore, the head processor 306 swaps the data element with the number two 814 from the temporary store with the first data element 812 in the second bucket. The head processor 306 advances the value of the head pointer 817 of the second bucket to point to the next data element position in the second bucket, as shown in the third phase 806.

Proceeding from the third phase 806 to the fourth phase 808, according to the present example, the head processor 306 determines that the data element with the number one 812 that is in the temporary store should be sorted into the first bucket. In the third phase 806, the head pointer for the first bucket is pointing to an empty data element position because the data element with a number three 810 was removed and swapped out. Therefore, the head processor 306 stores the data element with a number one 812 into the first position in the first bucket and then advances the value of the head pointer 818 in the first bucket to point to the data element 820 in the next position.

The head processor 306 then continues the radix sort algorithm by processing the data element 820 in the next position according to the bucket it belongs in. In this way, the data elements 810, 812, 814, 820, are sorted according to the radix sort algorithm.

When the data elements 810, 812, 814, 820, are all sorted, data elements with the number one will be in the first bucket, data elements with the number two will be in the second bucket, and data elements with the number three will be in the third bucket. It should be noted that the same process is followed by the tail processor 310 in processing data elements in each of the buckets. Starting in the position pointed to by the last pointer (also referred to as a tail pointer) in each of the buckets. The head processor 306 and the tail processor 310 can operate in parallel to process data elements in each bucket until each of the processors 306, 310, determines that the value of the head pointer is the same as the value of the tail pointer in each respective bucket. At this determination, the radix sort process is complete for the set of data elements 810, 812, 814, 820.

FIG. 4 illustrates a control/data flow graph of an example of a collection of logic circuit elements which can be found in at least a portion of a Radix Sort Accelerator (Accelerator) 208 as shown in FIG. 2. This collection of logic circuit elements, according to various embodiments, can be similarly found in the ASIC 302 as shown in FIG. 3.

One advantage over using general-purpose CPUs is that many CPU instructions on a general-purpose CPU can be replaced by simple logic circuit elements such as can be found in the Accelerator 208 (and similarly can be found in the ASIC 302). For example, the processing of a key on a CPU typically requires two instructions (shift and AND), which can be done with simple multiplexing. Further, the compare instruction typically used in a CPU can be done with exclusive-OR (XOR) logic circuits in the Accelerator 208. The inventors have determined that logic instructions can take 15-16 clock cycles while being performed by a CPU, while similar logic functions can take only 2-3 clock cycles using logic circuit elements in an Accelerator 208, such as those shown in FIG. 4, thereby considerably boosting the sorting performance in the Accelerator 208 over using instructions on a general-purpose CPU.

FIG. 9 provides an outline overview of an example radix sort process that can be followed by each of the head processor 306 and the tail processor 310. For each of two hundred fifty six buffers, the head processor 306 reads the data element pointed to by the head pointer for the particular bucket. The outline in FIG. 9 describes the process from the point of view of a head processor 306. However, a similar process can be performed by a tail processor 310. If the value in the head pointer equals the value in the tail pointer, then the head processor 306 and the tail processor 310 can stop processing the particular bucket.

However, if there is more to process, then at step 2.1 in the outline, the head processor 306 reads the data element at the top of the bucket, which is pointed to by the head pointer 308 for the particular bucket. According to the Radix sort algorithm, the head processor 306 uses the Radix mask to identify the significant symbol in the data element for sorting the data element. The head processor 306 then, based on this significant symbol value, looks at the corresponding buffer to swap the data element into the current head of the corresponding bucket. The head processor 306 then advances the value of the head pointer to point to the next data element in that bucket.

At step 2.4 in the outline, if the particular buffer has less than a lower threshold number of elements, then the pre-fetching engine 318 pre-fetches from the main memory 204 data elements from the array 206 and stores the data element into the particular bucket.

At step 2.5 in the outline, if the particular bucket has greater than a high threshold number of data elements, then the pre-fetching engine 318 flushes the already processed data elements from the particular bucket by storing them to the main memory 204 in the array 206.

This same process discussed above can be performed by the tail processor 310. When the value in the head pointer equals the value in the tail pointer the head processor 306 and the tail processor 310 handshake signals between themselves to each stop processing the particular bucket.

Figure 7:
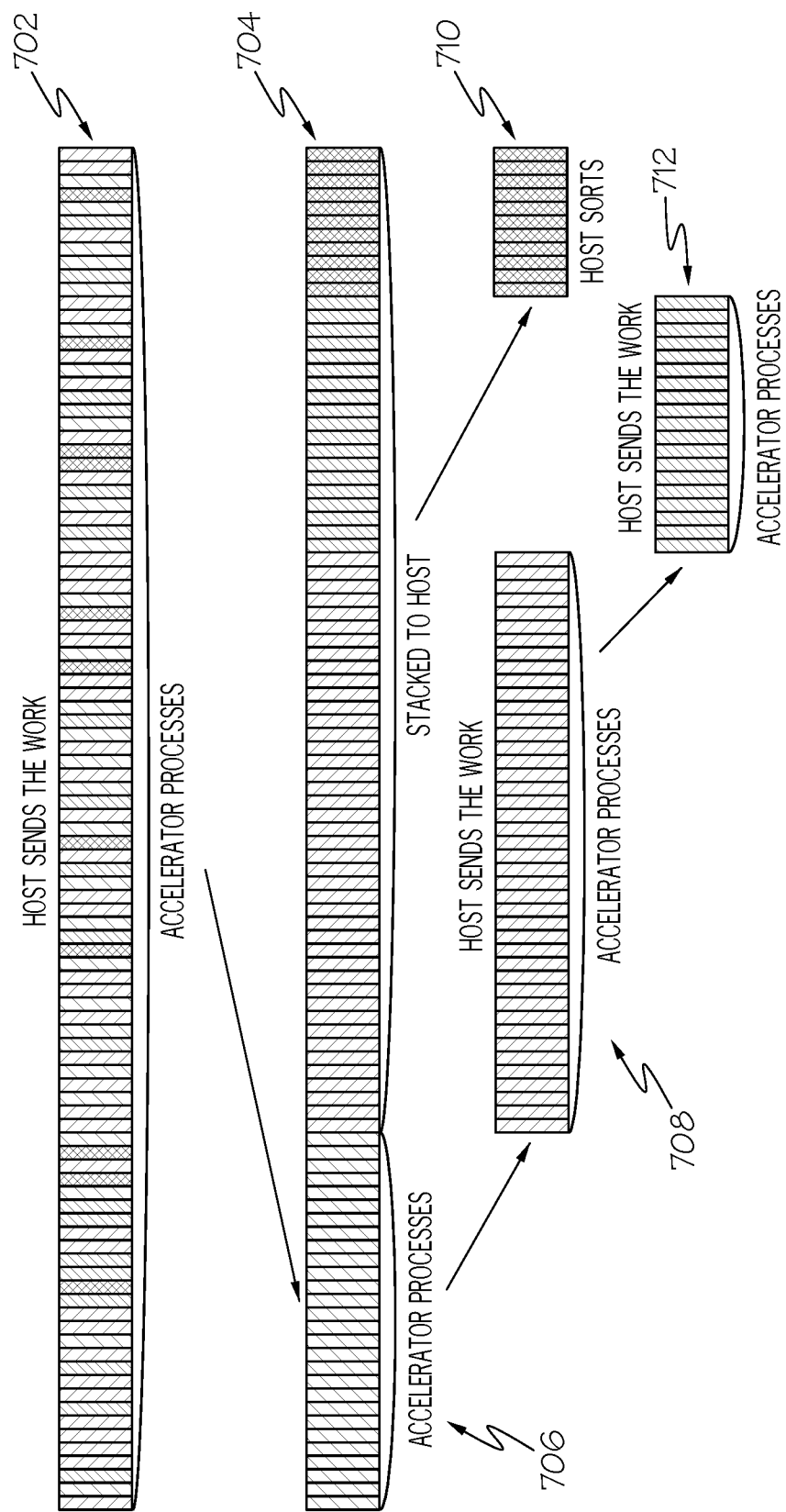
FIG. 7 is a block diagram illustrating an example of communication of data between a host processor and the ASIC radix sort accelerator of FIG. 3, according to an embodiment of an accelerated radix sort process.

FIG. 7 shows an example of how a host processor 304 and the Accelerator 302 can interact to solve a large radix sorting problem by decomposing the large radix sorting problem into a set of multiple smaller radix sub-sorting problems. The communication of information between the host processor 304 and the Accelerator 302 drives overall interactions therebetween as a co-accelerator model, i.e., where the host processor 304 can work as a parallel sort accelerator along with the Accelerator 302. That is, both the host processor 304 and the Accelerator 302 can both contemporaneously work on the same sorting problem, or on portions thereof.

During the course of radix sorting on the Accelerator 302, a large radix sorting problem can be decomposed into a set of multiple independent radix sub-sorting problems of various sizes. The Accelerator 302 informs the host processor 304 of a creation of such sub-problems from a larger sorting problem. The host processor 304 can decide whether it will take over at least one remaining sorting problem (e.g., because it is small enough) or leave the sorting problem to the Accelerator 302. Such co-accelerator model helps reduce overall elapsed time and eliminates the need for on-chip stack implementation on the Accelerator 302 architecture.

As illustrated in FIG. 7, the host processor 304 uses the ASIC accelerator 302 to break down a very large sorting problem into smaller sub-problems which can then be further sorted by either the Accelerator 302 or the host processor 304, or even another processor (not shown), under control of the sort memory manager 212.

The host processor 304 sends the initial problem for sorting to the Accelerator 302 in the first phase 702. The Accelerator 302 computes a histogram of all the data elements in the array 206 according to the Radix mask which indicates the significant symbol in every data element for applying the Radix sorting algorithm. After returning the histogram to the host processor 304 in the first phase 702, the host processor 304 sends the work for sorting data elements in the array 206 to the Accelerator 302 which then processes the data elements and creates several buckets sorted by the Radix mask at the second phase 704. According to the present example, the work that the host processor 304 sends to the Accelerator 302 based on the histogram is a new task for the Accelerator 302. The current work from which the histogram was generated will continue to be processed by the Accelerator 302. So, while Accelerator 302 sorts the current work, the host processor 304 analyzes the histogram to determine the upcoming sub-problems. The host processor 304 then, based at least one on the analysis of the histogram, sends a new task to the Accelerator 302. Since the Accelerator 302 is currently busy, the Accelerator 302 will store the incoming commands in a task queue for future sorting. In the present example, the communications between the host processor 304 and the Accelerator 302, and the assignments of new tasks from the host processor 304 to the Accelerator 302, are operations contemporaneous (e.g., generally in parallel) with the Accelerator 302 sorting a current work assignment. This interoperation between the host processor 304 and the Accelerator 302 is aimed at maximum throughput of data while radix sorting data elements in an array.

The Accelerator 302 then handshakes signals with the host processor 304 after having sorted all the data elements in the array 206 into the several buckets as shown in the second phase 704. The host processor 304, at the second phase 704, determines there are several sub-problems to solve, and sends a first sub-problem 706 to the Accelerator 302 which then sorts the data elements in the sub-problem.

The host processor 304, in the third phase 710, sends a second sub-problem 708 to the Accelerator 302 for sorting while contemporaneously the host processor 304 determines that the number of data elements in one of the several buckets is small enough for the host processor 304 to sort by itself. That is, the sorting sub-problem is simple enough that the host processor 304 determines to keep the sub-problem for sorting by the host processor 304.

After the Accelerator 302 sorts the second bucket 708 in the third phase 710, the host processor 304 in the fourth phase 712 sends the remaining bucket as a sub-problem to be sorted by the Accelerator 302. The Accelerator 302 processes the sub-problem in the fourth phase 712, thereby completing the radix sorting of the entire set of data elements in the array 206.

As illustrated in FIG. 7, a host processor 304 can manage a very large sorting problem by decomposing the problem into sub-problems with the assistance of the sorting Accelerator 302. The host processor 304 can, in this way, break down the initial very large problem into sub-problems which then the host processor 304 can decide whether to keep a sub-problem for sorting by itself or to send the sub-problem to the Accelerator 302 for sorting by the Accelerator 302.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches, buffers, and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor 202 is illustrated for information processing system 200, information processing systems with multiple CPUs or processors can be used equally effectively. Various embodiments of the present disclosure can further incorporate interfaces that each includes separate, fully programmed microprocessors that are used to off-load processing from the processor 202. An operating system (not shown) included in main memory for the information processing system 200 may be a suitable multitasking and/or multiprocessing operating system, such as, but not limited to, any of the Linux, UNIX, Windows, and Windows Server based operating systems. Various embodiments of the present disclosure are able to use any other suitable operating system. Some embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A method with an information processing system for accelerated radix sort processing of an array of data elements, the method comprising:

transferring, with a pre-fetching engine in an application specific integrated circuit radix sort accelerator (Accelerator), data elements from an array of data elements in main memory to an array of data elements in a first memory in the Accelerator to be radix sort processed in the Accelerator, the Accelerator and a host processor that is separate from the Accelerator contemporaneously share access to the data elements in the array of data elements in the main memory in a data streaming architecture in which the Accelerator radix sort processes the data elements in the array in main memory, the first memory capacity to store data elements from the array in the main memory being a small portion of the array of data elements in the main memory, the pre-fetching engine predicting which data elements will be needed in a near future radix sort process in the Accelerator;

radix sort processing, by at least one radix sort processor in the Accelerator, the data elements in the array of data elements in the first memory; and transferring, with the pre-fetching engine, the data elements that were radix sort processed in the array of data elements in the first memory in the Accelerator to the array of data elements in main memory.

2. The method of claim 1, wherein the at least one radix sort processor in the Accelerator comprises a head processor and a tail processor, and wherein the array of data elements in the radix sort bucket in the first memory comprises a first radix sort bucket in a plurality of radix sort buckets in the first memory, the method further comprising:

radix sort processing, with at least one of the head processor and the tail processor, data elements in the first radix sort bucket by the at least one of the head processor and the tail processor using a respective one of a head pointer and tail pointer to point to each data element in the first radix sort bucket;
applying a radix sort mask to a data element in the first radix sort bucket pointed to by a respective one of the head pointer and tail pointer, thereby identifying a significant radix sort symbol in the data element;
determining, based on the identified significant radix sort symbol in the data element, whether the data element belongs in the first radix sort bucket according to a radix sort algorithm; and
progressively advancing a value in the respective one of the head pointer and tail pointer to point to a next data element in the first radix sort bucket, based on determining that the data element belongs in the first radix sort bucket according to the radix sort algorithm.

3. The method of claim 2, wherein progressively advancing a value in the head pointer comprises updating a value in the head pointer to point with the value in the head pointer to a next data element in the first radix sort bucket starting at the head end of the first radix sort bucket and progressively advancing toward the tail end of the first radix sort bucket.

4. The method of claim 2, wherein the progressively advancing a value in the tail pointer comprises updating a value in the tail pointer to point with the value in the tail pointer to a next data element in the first radix sort bucket starting at the tail end of the first radix sort bucket and progressively advancing toward the head end of the first radix sort bucket.

5. The method of claim 2, further comprising:
swapping out the data element pointed to by the respective one of the head pointer and tail pointer from the first radix sort bucket into a second radix sort bucket in the plurality of radix sort buckets in the first memory, based on determining that the data element belongs in the second radix sort bucket according to the radix sort algorithm.

6. The method of claim 1, wherein the array of data elements in the radix sort bucket in the first memory comprises a first radix sort bucket in a plurality of radix sort buckets in the first memory, and wherein the transferring data elements from the array of data elements in main memory to the array of data elements in the first memory comprises:
transferring data elements, with the pre-fetching engine, between the array in main memory and a radix sort bucket selected from the plurality of radix sort buckets in the first memory in the Accelerator, the pre-fetching engine in a data streaming architecture in which the Accelerator radix sort processes the data elements in the array in main memory, the pre-fetching engine predicting which data elements will be needed in a near future radix sort process in the Accelerator, transferring the needed data elements, and hiding memory latency when accessing the array of data elements in the main memory.

7. The method of claim 6, wherein the transferring comprises transferring at least one data element from the array in main memory to the selected radix sort bucket, based on determining that a total number of data elements in the selected radix sort bucket reaches a low threshold of data elements remaining to be radix sort processed by the at least one radix sort processor, and wherein the transferring comprises transferring at least one data element from the selected radix sort bucket to the array in main memory, based on determining that a total number of data elements in the selected radix sort bucket reaches a high threshold of data elements remaining to be radix sort processed by the at least one radix sort processor.

8. The method of claim 1, wherein the transferring, with the pre-fetching engine, of data elements from the array of data elements in main memory to the array of data elements in the first memory in the Accelerator and the transferring, with the pre-fetching engine, of data elements from the array of data elements in the first memory in the Accelerator to the array of data elements in the main memory, comprises:
the pre-fetching engine transferring data elements between the array in main memory and the selected radix sort bucket contemporaneously with the plurality of radix sort processors radix sort processing data elements in the selected radix sort bucket.

9. The method of claim 1, further comprising:
decomposing, with the Accelerator, a large radix sorting problem of radix sorting the data elements in the array of data elements in the main memory into a set of multiple independent smaller radix sub-sorting problems of radix sorting data elements in the array of data elements in the main memory; and
assigning to the Accelerator a first independent smaller radix sub-sorting problem in the set of multiple independent smaller radix sub-sorting problems to be sorted by the Accelerator.

10. The method of claim 9, further comprising:
assigning to the at least one host processor, separate from the Accelerator, a second independent smaller radix sub-sorting problem in the set of multiple independent smaller radix sub-sorting problems to be sorted by the at least one host processor.

11. An information processing system capable of accelerated radix sort processing of an array of data elements, comprising:
at least one host processor;
main memory, communicatively coupled with the at least one host processor, and suitable for storing an array of data elements in the main memory;
an application specific integrated circuit radix sort accelerator (Accelerator), separate from the at least one host processor, and communicatively coupled with the at least one host processor and the main memory,
the Accelerator comprising:
a first memory for storing an array of data elements to be radix sort processed in the Accelerator;
at least one processor for radix sort processing data elements stored in the first memory;
a pre-fetching engine, communicatively coupled with the at least one processor in the Accelerator and with the at least one host processor, the pre-fetching engine and the at least one processor, responsive to computer instructions, performing the following method:
transferring, with the pre-fetching engine, data elements from the array of data elements in main memory to the array of data elements in the first memory in the Accelerator to be radix sort processed in the Accelerator, the Accelerator and the at least one host processor contemporaneously sharing access to the data elements in the array of data elements in the main memory in a data streaming architecture in which the Accelerator radix sort processes the data elements in the array in main memory, the first memory capacity to store data elements from the array in the main memory being a small portion of the array of data elements in the main memory, the pre-fetching engine predicting which data elements will be needed in a near future radix sort process in the Accelerator;

radix sort processing, by the at least one processor in the Accelerator, the data elements in the array of data elements in the first memory; and transferring, with the pre-fetching engine, the data elements that were radix sort processed in the array of data elements in the first memory in the Accelerator to the array of data elements in main memory.

12. The information processing system of claim 11, wherein the at least one processor in the Accelerator comprises a head processor and a tail processor, and wherein the array of data elements in the radix sort bucket in the first memory comprises a first radix sort bucket in a plurality of radix sort buckets in the first memory, the method further comprising:

radix sort processing, with at least one of the head processor and the tail processor, data elements in the first radix sort bucket by the at least one of the head processor and the tail processor using a respective one of a head pointer and tail pointer to point to each data element in the first radix sort bucket;

applying a radix sort mask to a data element in the first radix sort bucket pointed to by a respective one of the head pointer and tail pointer, thereby identifying a significant radix sort symbol in the data element;

determining, based on the identified significant radix sort symbol in the data element, whether the data element belongs in the first radix sort bucket according to a radix sort algorithm; and progressively advancing a value in the respective one of the head pointer and tail pointer to point to a next data element in the first radix sort bucket, based on determining that the data element belongs in the first radix sort bucket according to the radix sort algorithm.

13. The information processing system of claim 12, wherein progressively advancing a value in the head pointer comprises updating a value in the head pointer to point with the value in the head pointer to a next data element in the first radix sort bucket starting at the head end of the first radix sort bucket and progressively advancing toward the tail end of the first radix sort bucket.

14. The information processing system of claim 12, wherein the progressively advancing a value in the tail pointer comprises updating a value in the tail pointer to point with the value in the tail pointer to a next data element in the first radix sort bucket starting at the tail end of the first radix sort bucket and progressively advancing toward the head end of the first radix sort bucket.

15. The information processing system of claim 12, the method further comprising:

swapping out the data element pointed to by the respective one of the head pointer and tail pointer from the first radix sort bucket into a second radix sort bucket in the plurality of radix sort buckets in the first memory, based on determining that the data element belongs in the second radix sort bucket according to the radix sort algorithm.

16. The information processing system of claim 11, wherein the array of data elements in the radix sort bucket in the first memory comprises a first radix sort bucket in a plurality of radix sort buckets in the first memory, and wherein the transferring comprises:

transferring data elements, with the pre-fetching engine, between the array in main memory and a radix sort bucket selected from the plurality of radix sort buckets in the first memory in the Accelerator, the pre-fetching engine in a data streaming architecture in which the Accelerator radix sort processes the data elements in the array in main memory, the pre-fetching engine predicting which data elements will be needed in a near future radix sort process in the Accelerator, transferring the needed data elements, and hiding memory latency when accessing the array of data elements in the main memory.

17. The information processing system of claim 16, wherein the transferring comprises transferring at least one data element from the array in main memory to the selected radix sort bucket, based on determining that a total number of data elements in the selected radix sort bucket reaches a low threshold of data elements remaining to be radix sort processed by the at least one radix sort processor, and wherein the transferring comprises transferring at least one data element from the selected radix sort bucket to the array in main memory, based on determining that a total number of data elements in the selected radix sort bucket reaches a high threshold of data elements remaining to be radix sort processed by the at least one radix sort processor.

18. The information processing system of claim 11, wherein the transferring, with the pre-fetching engine, of data elements from the array of data elements in main memory to the array of data elements in the first memory in the Accelerator and the transferring, with the pre-fetching engine, of data elements from the array of data elements in the first memory in the Accelerator to the array of data elements in the main memory, comprises:

the pre-fetching engine transferring data elements between the array in main memory and the selected radix sort bucket contemporaneously with the at least one radix sort processor radix sort processing data elements in the selected radix sort bucket.

19. A computer readable storage medium, comprising computer instructions which, responsive to being executed by a processor of a plurality of processors of an information processing system, cause the processor to perform operations for accelerated radix sort processing of an array of data elements, the operations comprising:

transferring, with a pre-fetching engine in an application specific integrated circuit radix sort accelerator (Accelerator), data elements from an array of data elements in main memory to an array of data elements in a first memory in the Accelerator to be radix sort processed in the Accelerator, the Accelerator and a host processor that is separate from the Accelerator contemporaneously share access to the data elements in the array of data elements in the main memory in a data streaming architecture in which the Accelerator radix sort processes the data elements in the array in main memory, the first memory capacity to store data elements from the array in the main memory being a small portion of the array of data elements in the main memory, the pre-fetching engine predicting which data elements will be needed in a near future radix sort process in the Accelerator;

radix sort processing, by at least one radix sort processor in the Accelerator, the data elements in the array of data elements in the first memory; and transferring, with the pre-fetching engine, the data elements that were radix sort processed in the array of data elements in the first memory in the Accelerator to the array of data elements in main memory.

20. The computer readable storage medium of claim 19, wherein the array of data elements in the radix sort bucket in the first memory comprises a first radix sort bucket in a plurality of radix sort buckets in the first memory, and wherein the transferring data elements from the array of data elements in main memory to the array of data elements in the first memory comprises:

transferring data elements, with the pre-fetching engine, between the array in main memory and a radix sort bucket selected from the plurality of radix sort buckets in the first memory in the Accelerator, the pre-fetching engine in a data streaming architecture in which the Accelerator radix sort processes the data elements in the array in main memory, the pre-fetching engine predicting which data elements will be needed in a near future radix sort process in the Accelerator, transferring the needed data elements, and hiding memory latency when accessing the array of data elements in the main memory.

\* \* \* \* \*